(12) United States Patent
Wang et al.

(10) Patent No.: US 8,855,619 B2
(45) Date of Patent: Oct. 7, 2014

(54) METHOD FOR STATE TRANSITION AND NETWORK DEVICE

(71) Applicant: Huawei Technologies Co., Ltd., Shenzhen (CN)

(72) Inventors: Xueliang Wang, Shanghai (CN); Lin Zhou, Shanghai (CN); Zongquan Tang, Toronto (CA); Zhichao Shen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/727,889

(22) Filed: Dec. 27, 2012

(65) Prior Publication Data

US 2013/0115936 A1 May 9, 2013

Related U.S. Application Data

(63) Continuation of application No. 13/624,765, filed on Sep. 21, 2012, now abandoned, which is a continuation of application No. PCT/CN2011/072004, filed on Mar. 21, 2011.

(30) Foreign Application Priority Data

Mar. 22, 2010 (CN) .......................... 2010 1 0129163

(51) Int. Cl.
*H04M 3/00* (2006.01)
*H04W 8/22* (2009.01)
*H04W 76/04* (2009.01)

(52) U.S. Cl.
CPC .............. *H04W 8/22* (2013.01); *H04W 76/048* (2013.01); *H04W 76/046* (2013.01)
USPC ........ 455/418; 455/458; 455/432.1; 455/450; 455/550.1

(58) Field of Classification Search
USPC ................... 455/418, 458, 432.1, 450, 550.1; 370/335, 365
See application file for complete search history.

(56) References Cited

U.S. PATENT DOCUMENTS

| 2005/0037769 A1 | 2/2005 | Jami et al. |
| 2006/0111110 A1 | 5/2006 | Schwarz et al. |

(Continued)

FOREIGN PATENT DOCUMENTS

| CN | 1685754 A | 10/2005 |
| CN | 1829379 A | 9/2006 |

(Continued)

OTHER PUBLICATIONS

Written Opinion of the International Searching Authority recieved in International Application No. PCT/CN2011/0702004, Applicant: Huawei Technologies Co. Ltd., et al. mailed Jun. 30, 2011, 4 pages.

(Continued)

*Primary Examiner* — Manpreet Matharu
(74) *Attorney, Agent, or Firm* — Slater & Matsil, L.L.P.

(57) ABSTRACT

A method for a state transition includes determining whether a user equipment (UE) is a UE frequently performing state transitions. When the state of the UE is required to be transitioned to the idle state, a state of the UE is transitioned to a paging channel (PCH) state if the UE is a UE frequently performing state transitions. If the UE is a UE infrequently performing state transitions, the state of the UE is transitioned to the idle state.

10 Claims, 6 Drawing Sheets

(56) References Cited

U.S. PATENT DOCUMENTS

| | | | |
|---|---|---|---|
| 2008/0194266 A1* | 8/2008 | Islam et al. | 455/450 |
| 2009/0042560 A1 | 2/2009 | Islam et al. | |
| 2009/0275334 A1 | 11/2009 | Xie et al. | |
| 2011/0070900 A1* | 3/2011 | Shi et al. | 455/458 |
| 2011/0207465 A1* | 8/2011 | Dwyer et al. | 455/450 |
| 2013/0115936 A1 | 5/2013 | Wang et al. | |

FOREIGN PATENT DOCUMENTS

| | | | | |
|---|---|---|---|---|
| CN | 101111050 A | 1/2008 | | |
| CN | 101115263 A | 1/2008 | | |
| CN | 101227705 A | 7/2008 | | |
| CN | 101365236 A | 2/2009 | | |
| CN | 102202422 B | 1/2014 | | |
| EP | 1 892 895 A1 | 2/2008 | | |
| EP | 1 981 224 A1 | 10/2008 | | |
| EP | 2 061 192 A1 | 5/2009 | | |
| EP | 2061192 A1 * | 5/2009 | | H04L 12/56 |

OTHER PUBLICATIONS

International Search Report recieved in International Application No. PCT/CN2011/072004, Applicant Huawei Technologies Co., Ltd., et al., mailed Jun. 30, 2011, 3 pages.

Nokia Siemens Networks, et al., "Clarification on Enhanced SCRI approach for fast dormancy," 3GPP TSG-RAN, RP-090942, Seville, Spain, Sep. 15-18, 2009, 10 pages.

"3$^{rd}$ Generation Partnership Project; Technical Specification Group Radio Access Network; Radio Resource Control (RRC); Protocol Specification (Release 8)," 3GPP Standard; 3GPP TS 25.331, 3$^{rd}$ Generation Partnership project (3GPP), V8.8.0, Sep. 2009, pp. 49-52.

Chinese Search Report received in Application No. 2010101291631 mailed Feb. 24, 2013, 2 pages.

Extended European Search Report received in Application No. 11758786.5-1857, Applicant: Huawei Technologies Co., Ltd., mailed Mar. 15, 2013, 7 pages.

Haverinen, Henry et al., "Energy Consumption of Always-On Applications in WCDMA Networks," IEEE, Apr. 1, 2007, pp. 964-968.

Research in Motion UK Limited, "Application of Fast Dormancy," 3GPP TSG-RAN WG2#67bis, Tdoc R2-096027, Miyazaki, Japan, Oct. 12-16, 2009, 4 pages.

United States Office Action received in U.S. Appl. No. 13/624,765, mailed Apr. 30, 2013, 25 pages.

* cited by examiner

METHOD FOR STATE TRANSITION AND NETWORK DEVICE

CROSS-REFERENCE TO RELATED APPLICATIONS

This application is a continuation of U.S. patent application Ser. No. 13/624,765, filed on Sep. 21, 2012, which is a continuation of International Application No. PCT/CN2011/072004, filed on Mar. 21, 2011, which claims priority to Chinese Patent Application No. 201010129163.1, filed Mar. 22, 2010. The afore-mentioned patent applications are hereby incorporated by reference in their entireties.

TECHNICAL FIELD

The present disclosure relates to the field of communications, and in particular, to a method for a state transition and a network device.

BACKGROUND

In order to achieve the aims of intelligence, electricity saving and communication resource saving, currently, some User Equipments (UEs) may automatically perform a state transition between a connected state and an idle state as required.

For example, when an intelligent mobile phone is in an idle state, if service data to be sent exists, the intelligent mobile phone automatically sends a Radio Resource Control (RRC) signaling connection request to an access network side device (such as a base station controller), so that the access network side device sets up a radio access bearer for the intelligent mobile phone according to the RRC signaling connection request and transits the intelligent mobile phone from the idle state to a connected state; when the intelligent mobile phone is in the connected state, if no service data to be sent exists, the intelligent mobile phone automatically sends a Signaling Connection Release Indication to the access network side device, so that the access network side device releases the radio access bearer set up for the intelligent mobile phone according to the Signaling Connection Release Indication and transits the intelligent mobile phone from the connected state to the idle state.

However, when the state of the UE is frequently transitioned, the access network side device has to frequently set up/release the radio access bearer for the UE, resulting in a heavy workload.

SUMMARY OF THE INVENTION

Embodiments of the present disclosure provide a method for a state transition and a network device, which are capable of lightening the workload of an access network side device during a state transition process of a UE.

In one aspect, an embodiment of the present disclosure provides a method for a state transition, which includes: judging whether a UE is a UE frequently performing state transitions; transitioning a state of the UE to a Paging Channel (PCH) state if the UE is a UE frequently performing state transitions and when the state of the UE is required to be transitioned to an idle state; and transitioning the state of the UE to the idle state if the UE is a UE infrequently performing state transitions and when the state of the UE is required to be transitioned to the idle state.

In another aspect, an embodiment of the present disclosure further provides a network device, including 1 a judging module, configured to judge whether a UE is a UE frequently performing state transitions and a state transition module, configured to transit a state of the UE to a PCH state if the judging module judges that the UE is a UE frequently performing state transitions and when the state of the UE is required to be transitioned to an idle state, and transit the state of the UE to the idle state if the judging module judges that the UE is a UE infrequently performing state transitions and when the state of the UE is required to be transitioned to the idle state.

For the method for a state transition and the network device provided in the embodiments of the present disclosure, the UE frequently performing state transitions is transitioned to the PCH state when the state of the UE is required to be transitioned to the idle state, so that an access network side device does not need to frequently set up/release a radio access bearer for the UE, thereby lightening the workload of the access network side device during a state transition process of the UE frequently performing state transitions; and the UE infrequently performing state transitions is transitioned to the idle state when the state of the UE is required to be transitioned to the idle state, so that the access network side device does not need to maintain the PCH state of the UE infrequently performing state transitions, thereby lightening the workload of the access network side device during a state transition process of the UE infrequently performing state transitions.

BRIEF DESCRIPTION OF THE DRAWINGS

To illustrate the technical solutions according to the embodiments of the present disclosure or in the prior art more clearly, the accompanying drawings required for describing the embodiments or the prior art are introduced below briefly. Apparently, the accompanying drawings in the following descriptions merely show some of the embodiments of the present disclosure, and persons of ordinary skill in the art can obtain other drawings according to the accompanying drawings without creative efforts.

DETAILED DESCRIPTION OF ILLUSTRATIVE EMBODIMENTS

The technical solutions according to the embodiments of the present disclosure will be clearly and fully described in the following with reference to the accompanying drawings. It is obvious that the embodiments to be described are only a part rather than all of the embodiments of the present disclosure. Any other embodiment obtained by persons of ordinary skill in the art based on the embodiments of the present disclosure without creative efforts shall fall within the protection scope of the present disclosure.

In order to solve the problem that an access network side device has a heavy workload during a state transition process of a UE in the prior art, the embodiments of the present disclosure provide a method for a state transition and a network device.

Figure 1:
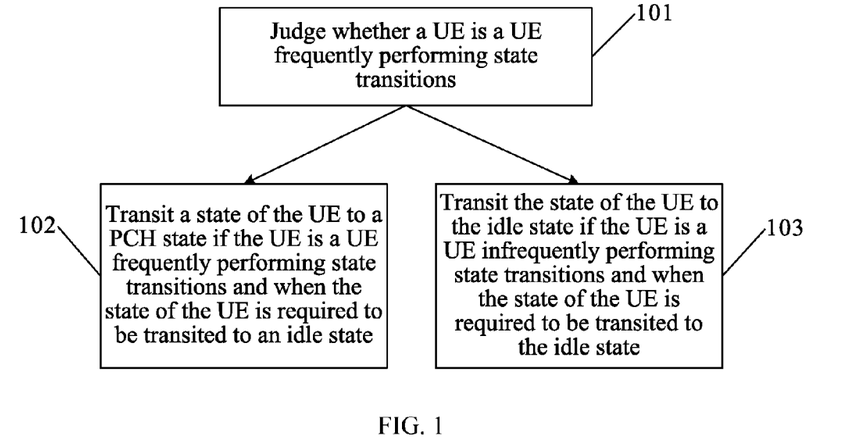
FIG. 1 is a flow chart of a method for a state transition according to an embodiment of the present disclosure.

As shown in FIG. 1, a method for a state transition provided in an embodiment of the present disclosure includes a number of steps.

Step 101: Judge whether a UE is a UE frequently performing state transitions.

Step 102: Transit a state of the UE to a PCH state if the UE is a UE frequently performing state transitions and when the state of the UE is required to be transitioned to an idle state.

Step 103: Transit the state of the UE to the idle state if the UE is a UE infrequently performing state transitions and when the state of the UE is required to be transitioned to the idle state.

For the method for a state transition provided in the embodiment of the present disclosure, the UE frequently performing state transitions is transitioned to the PCH state when the state of the UE is required to be transitioned to the idle state, so that an access network side device does not need to frequently set up/release a radio access bearer for the UE, thereby lightening the workload of the access network side device during a state transition process of the UE frequently performing state transitions; and the UE infrequently performing state transitions is transitioned to the idle state when the state of the UE is required to be transitioned to the idle state, so that the access network side device does not need to maintain the PCH state of the UE infrequently performing state transitions, thereby lightening the workload of the access network side device during a state transition process of the UE infrequently performing state transitions.

In order to enable persons skilled in the art to understand the technical solution provided in the embodiment of the present disclosure more clearly, the method for a state transition provided in the embodiment of the present disclosure is described in detail through specific embodiments in the following.

Figure 2:
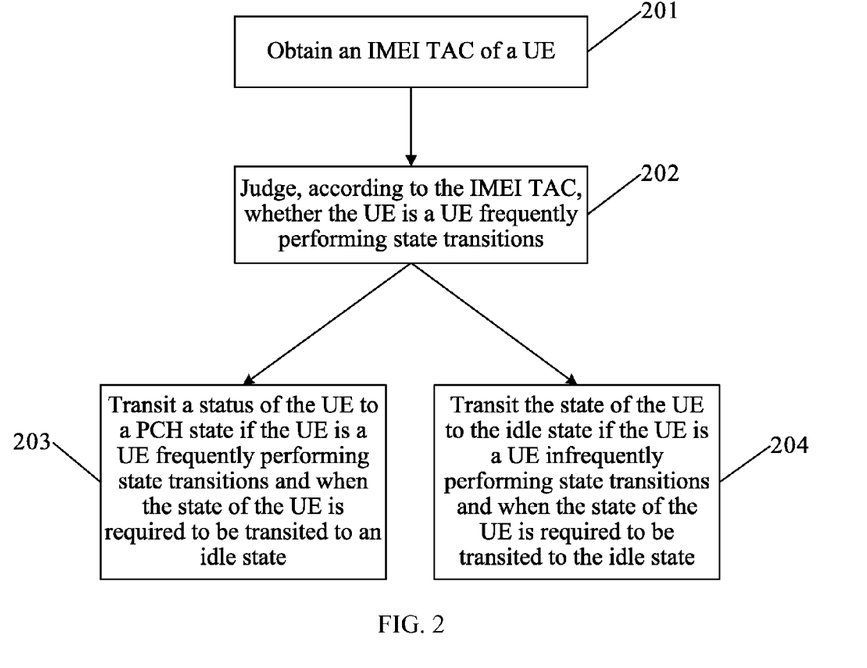
FIG. 2 is a flow chart of a method for a state transition according to another embodiment of the present disclosure.

As shown in FIG. 2, a method for a state transition provided in another embodiment of the present disclosure includes a number of steps.

Figure 3:
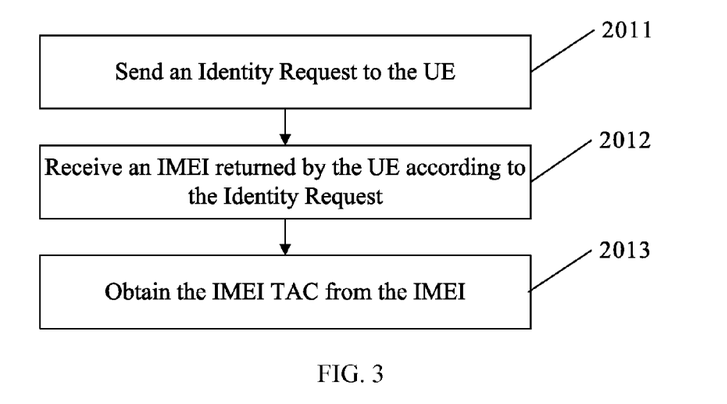
FIG. 3 is a flow chart of step 201 shown in FIG. 2.

Step 201: Obtain an International Mobile Equipment Identity TAC (IMEI TAC) of a UE. For example, as shown in FIG. 3, step 201 may include Step 2011, i.e., Send an Identity Request to the UE.

In this embodiment, step 2011 may be performed during the RRC connection phase of the UE, and may also be performed after a Signaling Connection Release Indication sent by the UE is received. Definitely, in practical implementations, the step may also be performed during other phases, but not all scenarios are described in detail here.

Step 2012: Receive an International Mobile Equipment Identity (IMEI) returned by the UE according to the Identity Request.

In this embodiment, the IMEI may be carried in an Identity Response.

Step 2013: Obtain the IMEI TAC from the IMEI received in step 2012.

Step 202: Judge, according to the IMEI TAC obtained in step 201, whether the UE is a UE frequently performing state transitions.

In this embodiment, for example, step 202 may include, first, searching for information of a terminal type corresponding to the IMEI TAC obtained in step 201 from a pre-stored correspondence relational table of the IMEI TAC and the terminal type.

For example, in this embodiment, the UE may be classified into two types. One is an intelligent terminal capable of automatically performing the state transition, which involves frequent state transitions; and the other is a dumb terminal incapable of automatically performing the state transition, which involves infrequent state transitions. Definitely, the UE may also be classified into two types. One is a terminal frequently performing state transitions; and the other is a terminal infrequently performing state transitions.

In this embodiment, the correspondence relational table of the IMEI TAC and the terminal type may include the IMEI TAC of the UE and the information of the terminal type corresponding to the UE, as shown in Table 1.

TABLE 1

| IMEI TAC | Terminal Type |
|----------|---------------|
| 011776 | Intelligent terminal |
| 356219 | Intelligent terminal |
| 356385 | Dumb terminal |
| 356411 | Dumb terminal |

The terminal type in the correspondence relational table of the IMEI TAC and the terminal type may be preset to be a default value, for example, the terminal type is an intelligent terminal (or a dumb terminal). At this time, the correspondence relational table of the IMEI TAC and the terminal type may also only include the IMEI TAC of the UE, that is, become an IMEI TAC list corresponding to the intelligent terminal (or the dumb terminal). For example, the terminal type in the correspondence relational table of the IMEI TAC and the terminal type is preset to be an intelligent terminal; in this case, the correspondence relational table of the IMEI TAC and the terminal type is shown in Table 2.

TABLE 2

| IMEI TAC |
|----------|
| 011776 |
| 356219 |
| 011775 |

The embodiment of the present disclosure is not intended to limit the specific form of the correspondence relational table of the IMEI TAC and the terminal type. In practical implementations, the correspondence relational table of the IMEI TAC and the terminal type may also be in other forms, which are not described in detail here.

In this embodiment, the correspondence relational table of the IMEI TAC and the terminal type may be preset by an operator through a user interface.

Then, judge, according to the information of the terminal type, whether the UE is a UE frequently performing state transitions.

In this embodiment, if the information of the terminal type is an intelligent terminal, the UE is a UE frequently performing state transitions; if the information of the terminal type is a dumb terminal, the UE is a UE infrequently performing state transitions.

Step 203: Transit a state of the UE to a PCH state if the UE is a UE frequently performing state transitions and when the state of the UE is required to be transitioned to an idle state.

In this embodiment, a method for determining whether the state of the UE is required to be transitioned to the idle state may be, for example, as follows: If a Signaling Connection Release Indication sent by the UE is received, determining that the state of the UE is required to be transitioned to the idle state; or, presetting a timer configured to detect the state transition, starting the timer when the UE is in a Dedicated Channel (DCH) state, and if no service data sent by the UE is received within a counting time of the timer, determining that the state of the UE is required to be transitioned to the idle state.

Definitely, in practical implementations, other methods may also be used to determine whether the state of the UE is required to be transitioned to the idle state, but not all scenarios are described in detail here.

Step 204: Transit the state of the UE to the idle state if the UE is a UE infrequently performing state transitions and when the state of the UE is required to be transitioned to the idle state.

For the method for a state transition provided in the embodiment of the present disclosure, the UE frequently performing state transitions is transitioned to the PCH state when the state of the UE is required to be transitioned to the idle state, so that an access network side device does not need to frequently set up/release a radio access bearer for the UE, thereby lightening the workload of the access network side device during a state transition process of the UE frequently performing state transitions; and the UE infrequently performing state transitions is transitioned to the idle state when the state of the UE is required to be transitioned to the idle state, so that the access network side device does not need to maintain the PCH state of the UE infrequently performing state transitions, thereby lightening the workload of the access network side device during a state transitions process of the UE infrequently performing state transitions. Through the technical solution provided in the embodiment of the present disclosure, the number of users in the PCH state is controlled while lightening the load on the signaling plane of the access network side device, so that the occupation of logic resources of the access network side device is reduced to ensure a system capacity.

Figure 4:
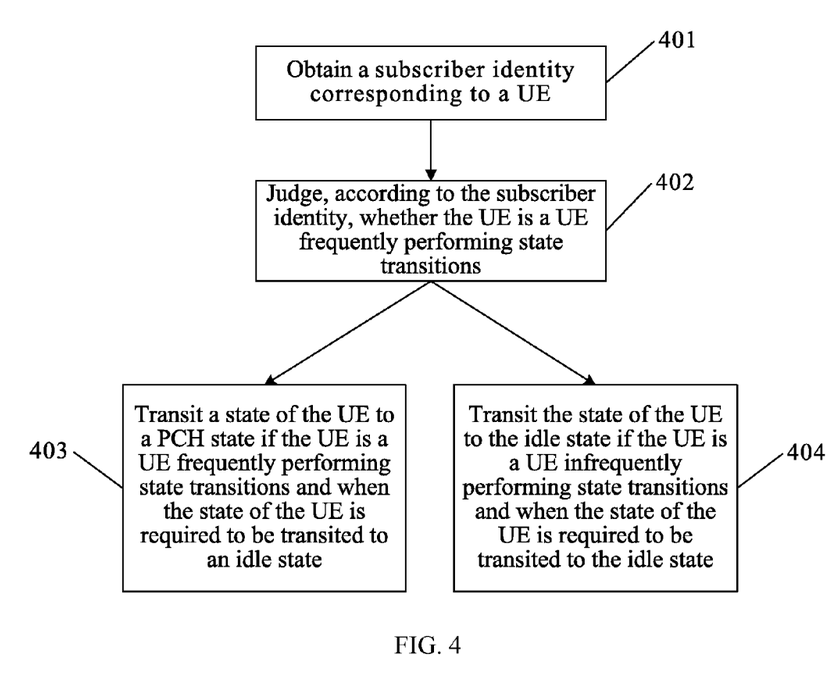
FIG. 4 is a flow chart of a method for a state transition according to still another embodiment of the present disclosure.

As shown in FIG. 4, another embodiment of the present disclosure further provides a method for a state transition, which includes a number of steps.

Step 401: Obtain a subscriber identity corresponding to a UE.

In this embodiment, the subscriber identity may include: a Temporary Mobile Subscriber Identity (TMSI), or an International Mobile Subscriber Identity (IMSI). In practical implementations, the subscriber identity may also be other identifications that may uniquely identify a user identity, which are not described in detail here.

Figure 5:
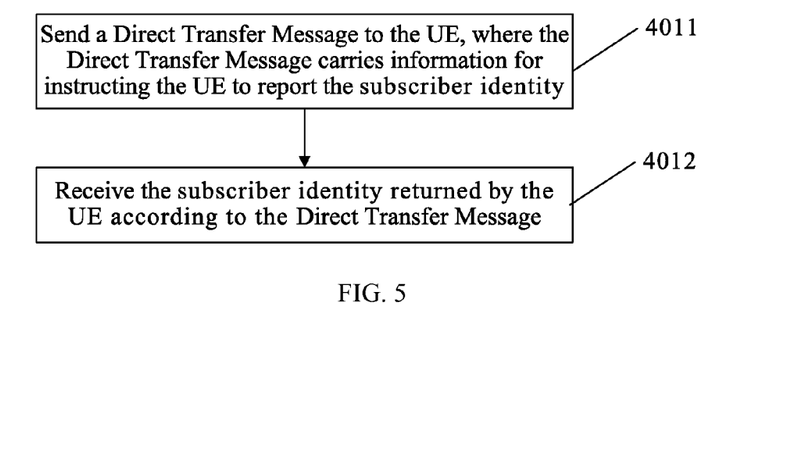
FIG. 5 is a flow chart of step 401 shown in FIG. 4.

For example, as shown in FIG. 5, step 401 may include Step 4011, i.e., send a Direct Transfer Message to the UE, where the Direct Transfer Message carries information for instructing the UE to report the subscriber identity.

In this embodiment, step 4011 may be performed during the RRC connection phase of the UE; and may also be performed after a Signaling Connection Release Indication sent by the UE is received. Definitely, in practical implementations, the step may also be performed during other phases, but not all scenarios are described in detail here.

Step 4012: Receive the subscriber identity returned by the UE according to the Direct Transfer Message.

In this embodiment, if the subscriber identity is the TMSI, the subscriber identity (TMSI) in step 4012 may be carried in an RRC connection request message sent by the UE; if the subscriber identity is the IMSI, the subscriber identity (IMSI) in step 4012 may be carried in an Identity Response sent by the UE.

Step 402: Judge, according to the subscriber identity obtained in step 401, whether the UE is a UE frequently performing state transitions.

In this embodiment, for example, step 402 may include, first, searching for information of the terminal type corresponding to the subscriber identity obtained in step 401 from a pre-stored correspondence relational table of the subscriber identity and the terminal type.

For example, in this embodiment, the UE may be classified into two types. One is an intelligent terminal capable of automatically performing the state transition, which involves frequent state transitions; and the other is a dumb terminal incapable of automatically performing the state transitions, which involves infrequent state transitions. Definitely, the UE may also be classified into two types. One is a terminal frequently performing state transitions; and the other is a terminal infrequently performing state transitions.

In this embodiment, the correspondence relational table of the subscriber identity (TMSI/IMSI) and the terminal type may include the subscriber identity (TMSI/IMSI) and the corresponding information of the terminal type, as shown in Table 3.

TABLE 3

| Subscriber Identity (TMSI/IMSI) | Terminal Type |
| --- | --- |
| 80002896/460070012340001 | Intelligent terminal |
| 80002895/460070012340002 | Intelligent terminal |
| 80002894/460070012340003 | Dumb terminal |
| 80002893/460070012340004 | Dumb terminal |

The terminal type in the correspondence relational table of the subscriber identity (TMSI/IMSI) and the terminal type may be preset to be a default value, for example the terminal type is an intelligent terminal (or a dumb terminal). At this time, the correspondence relational table of the subscriber identity (TMSI/IMSI) and the terminal type may also only include the subscriber identity (TMSI/IMSI), that is, become a subscriber identity (TMSI/IMSI) list corresponding to the intelligent terminal (or the dumb terminal). For example, the terminal type in the correspondence relational table of the subscriber identity (TMSI/IMSI) and the terminal type is preset to be an intelligent terminal; in this case, the correspondence relational table of the subscriber identity (TMSI/IMSI) and the terminal type is shown in Table 4.

TABLE 4

| Subscriber Identity (TMSI/IMSI) |
| --- |
| 80002896/460070012340001 |
| 80002895/460070012340002 |
| 80002892/460070012340005 |

The embodiment of the present disclosure is not intended to limit the specific form of the correspondence relational table of the subscriber identity (TMSI/IMSI) and the terminal type. In practical implementations, the correspondence relational table of the subscriber identity (TMSI/IMSI) and the terminal type may also be in other forms, which are not described in detail here.

In this embodiment, the correspondence relational table of the subscriber identity (TMSI/IMSI) and the terminal type may be preset by an operator through a user interface.

Then, judge, according to the information of the terminal type, whether the UE is a UE frequently performing state transitions.

In this embodiment, if the information of the terminal type is an intelligent terminal, the UE is a UE frequently performing state transitions. If the information of the terminal type is a dumb terminal, the UE is a UE infrequently performing state transitions.

Step 403: Transit a state of the UE to a PCH state if the UE is a UE frequently performing state transitions and when the state of the UE is required to be transitioned to an idle state.

In this embodiment, a method for determining whether the state of the UE is required to be transitioned to the idle state may be, for example, as follows. If a Signaling Connection Release Indication sent by the UE is received, determining that the state of the UE is required to be transitioned to the idle state; or, presetting a timer configured to detect the state transition, starting the timer when the UE is in a DCH state, and if no service data sent by the UE is received within a counting time of the timer, determining that the state of the UE is required to be transitioned to the idle state.

Definitely, in practical implementations, other methods may also be used to determine whether the state of the UE is required to be transitioned to the idle state, but not all scenarios are described in detail here.

Step 404: Transit the state of the UE to the idle state if the UE is a UE infrequently performing state transitions and when the state of the UE is required to be transitioned to the idle state.

For the method for a state transition provided in the embodiment of the present disclosure, the UE frequently performing state transitions is transitioned to the PCH state when the state of the UE is required to be transitioned to the idle state, so that an access network side device does not need to frequently set up/release a radio access bearer for the UE, thereby lightening the workload of the access network side device during a state transition process of the UE frequently performing state transitions; and the UE infrequently performing state transitions is transitioned to the idle state when the state of the UE is required to be transitioned to the idle state, so that the access network side device does not need to maintain the PCH state of the UE infrequently performing state transitions, thereby lightening the workload of the access network side device during a state transition process of the UE infrequently performing state transitions. Through the technical solution provided in the embodiment of the present disclosure, the number of users in the PCH state is controlled while lightening the load on the signaling plane of the access network side device, so that the occupation of logic resources of the access network side device is reduced to ensure a system capacity.

Figure 6:
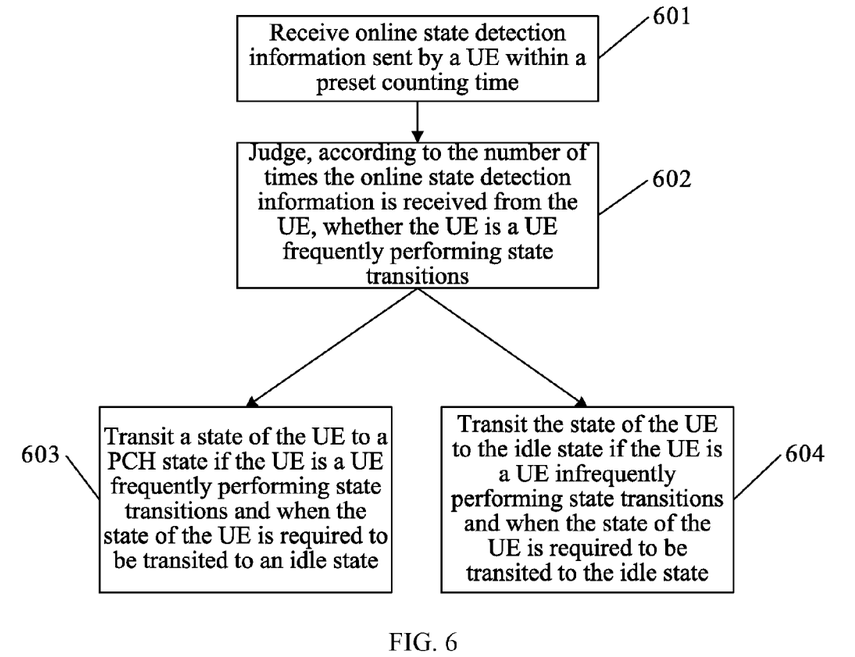
FIG. 6 is a flow chart of a method for a state transition according to yet still another embodiment of the present disclosure.

As shown in FIG. 6, still another embodiment of the present disclosure also provides a method for a state transition, which includes the following steps.

Step 601: Receive online state detection information sent by a UE within a preset counting time.

In this embodiment, the counting time may be set according to actual requirements.

The online state detection information may be a control signaling sent by the UE. For example, the online state detection information may be a Signaling Connection Release Indication sent by the UE; may be a data packet with a small amount of bits, for example, a data packet whose size is less than 1 K, sent by the UE, may be pre-defined as the online state detection information; and may also be a self-defined data packet, but not all scenarios are described in detail here.

Step 602: Judge, according to the number of times the online state detection information is received from the UE, whether the UE is a UE frequently performing state transitions.

In this embodiment, a threshold of the number of times may be preset. For example, the threshold is set to be 2. If the number of times the online state detection information is received in step 601 is larger than or equal to the threshold, the UE is a UE frequently performing state transitions; otherwise, the UE is a UE infrequently performing state transitions.

Step 603: Transit a state of the UE to a PCH state if the UE is a UE frequently performing state transitions and when the state of the UE is required to be transitioned to an idle state.

In this embodiment, a method for determining whether the state of the UE is required to be transitioned to the idle state may be, for example, as follows: If a Signaling Connection Release Indication sent by the UE is received, determining that the state of the UE is required to be transitioned to the idle state; or, presetting a timer configured to detect the state transition, starting the timer when the UE is in a DCH state, and if no service data sent by the UE is received within a counting time of the timer, determining that the state of the UE is required to be transitioned to the idle state.

Definitely, in practical implementations, other methods may also be used to determine whether the state of the UE is required to be transitioned to the idle state, but not all scenarios are described in detail here.

Step 604: Transit the state of the UE to the idle state if the UE is a UE infrequently performing state transitions and when the state of the UE is required to be transitioned to the idle state.

Optionally, the method for a state transition provided in the embodiment of the present disclosure may further include the following steps:

Obtain an IMEI TAC of the UE or a subscriber identity corresponding to the UE.

Determine, according to the judging result of whether the UE is a UE frequently performing state transitions obtained in step 602, the terminal type of the UE.

In this embodiment, if the UE is a UE frequently performing state transitions, it is determined that the terminal type of the UE is an intelligent terminal; and if the UE is a UE infrequently performing state transitions, it is determined that the terminal type of the UE is a dumb terminal.

Store a correspondence relation between the IMEI TAC of the UE or the subscriber identity corresponding to the UE and the terminal type of the UE.

In this embodiment, the correspondence relation between the IMEI TAC and the terminal type of the UE may be stored in the correspondence relational table of the IMEI TAC and the terminal type; and the correspondence relation between the subscriber identity corresponding to the UE and the terminal type of the UE may be stored in the correspondence relational table of the subscriber identity and the terminal type. Definitely, in practical implementations, other storage forms may also be used, which are not described in detail here.

The UE frequently performing state transitions is transitioned to the PCH state when the state of the UE is required to be transitioned to the idle state, so that an access network side device does not need to frequently set up/release a radio access bearer for the UE, thereby lightening the workload of the access network side device during a state transition process of the UE frequently performing state transitions; and the UE infrequently performing state transitions is transitioned to the idle state when the state of the UE is required to be transitioned to the idle state, so that the access network side device does not need to maintain the PCH state of the UE infrequently performing state transitions, thereby lightening the workload of the access network side device during a state transition process of the UE infrequently performing state transitions. Through the technical solution provided in the embodiment of the present disclosure, the number of users in the PCH state is controlled while lightening the load on the signaling plane of the access network side device, so that the occupation of logic resources of the access network side device is reduced to ensure a system capacity.

Figure 7:
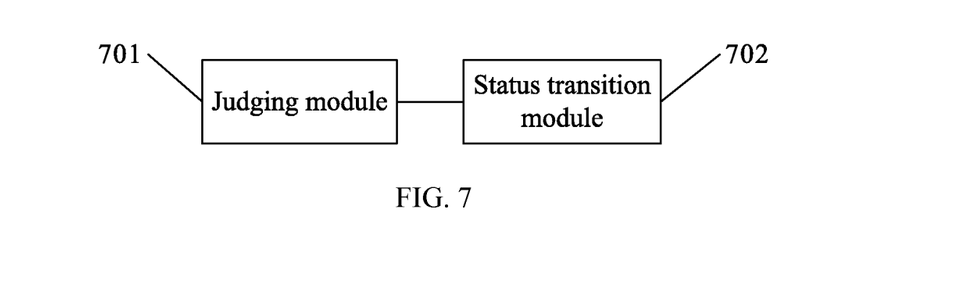
FIG. 7 is a schematic structure diagram of a network device according to an embodiment of the present disclosure.

As shown in FIG. 7, an embodiment of the present disclosure further provides a network device, including a judging module 701, configured to judge whether a UE is a UE frequently performing state transitions and a state transition module 702, configured to transit a state of the UE to a PCH state if the judging module 701 judges that the UE is a UE frequently performing state transitions and when the state of the UE is required to be transitioned to an idle state, and transit the state of the UE to the idle state if the judging module 701 judges that the UE is a UE infrequently performing state transitions and when the state of the UE is required to be transitioned to the idle state.

Figure 8:
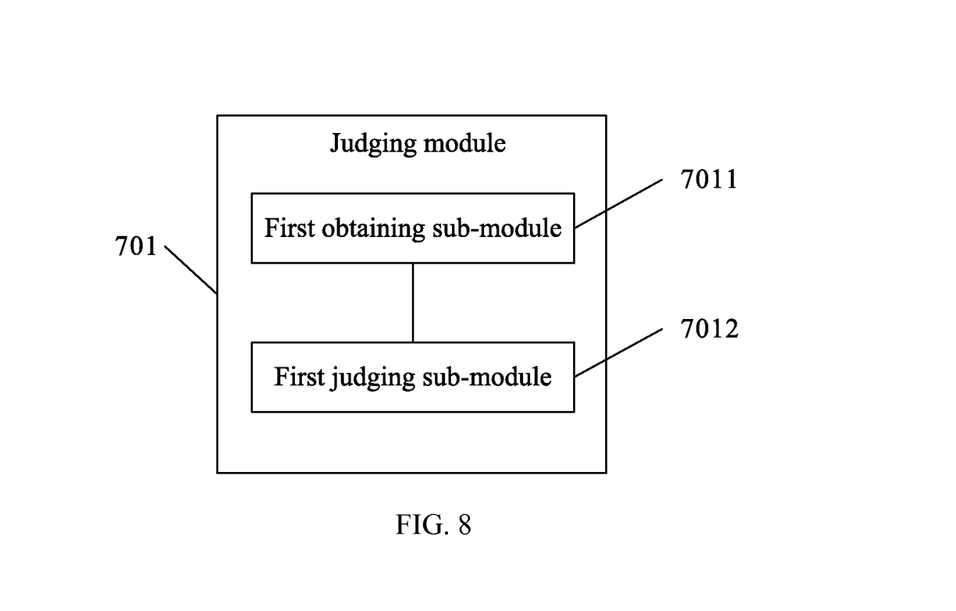
FIG. 8 is a first schematic structure diagram of a judging module shown in FIG. 7.

Moreover, for example, as shown in FIG. 8, the judging module 701 may include a first obtaining sub-module 7011, configured to obtain an IMEI TAC of the UE and a first judging sub-module 7012, configured to judge, according to the IMEI TAC obtained by the first obtaining sub-module 7011, whether the UE is a UE frequently performing state transitions.

Moreover, in this embodiment, the first obtaining sub-module 7011 may be specifically configured to send an Identity Request to the UE; receive an IMEI returned by the UE according to the Identity Request; and obtain the IMEI TAC from the IMEI.

Figure 9:
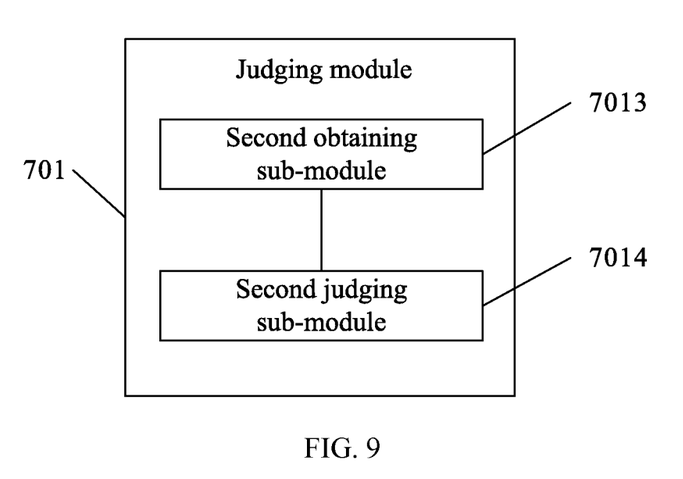
FIG. 9 is a second schematic structure diagram of the judging module shown in FIG. 7.

Moreover, for example, as shown in FIG. 9, the judging module 701 may include a second obtaining sub-module 7013, configured to obtain the subscriber identity corresponding to the UE and a second judging sub-module 7014, configured to judge, according to the subscriber identity obtained by the second obtaining sub-module 7013, whether the UE is a UE frequently performing state transitions.

Figure 10:
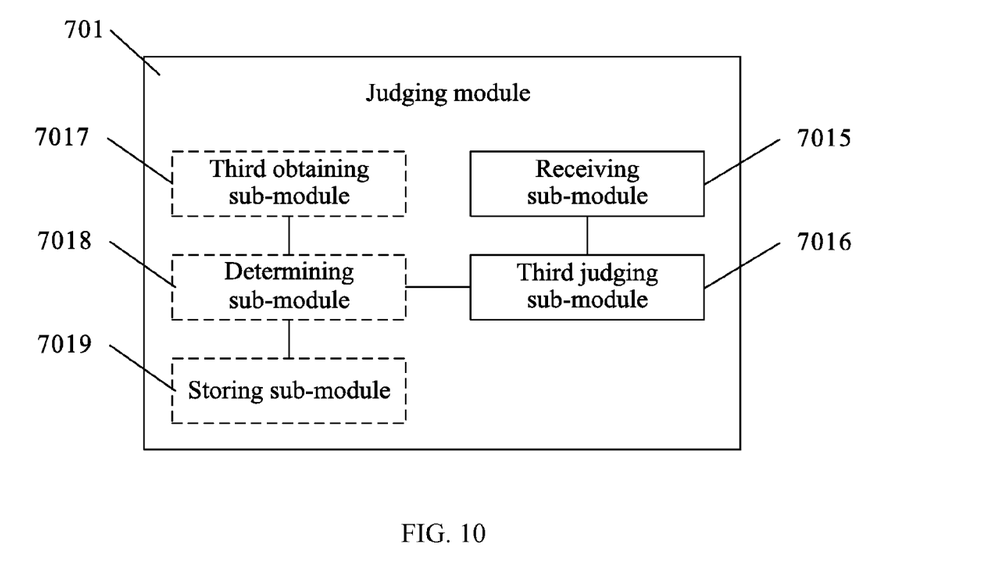
FIG. 10 is a third schematic structure diagram of the judging module shown in FIG. 7.

Moreover, for example, as shown in FIG. 10, the judging module 701 may include a receiving sub-module 7015, configured to receive online state detection information sent by the UE within a preset counting time and a third judging sub-module 7016, configured to judge, according to the number of times the online state detection information is received by the receiving sub-module 7015 from the UE, whether the UE is a UE frequently performing state transitions.

Moreover, as shown in FIG. 10, optionally, the judging module 701 may further include a third obtaining sub-module 7017, configured to obtain the IMEI TAC of the UE, or the subscriber identity corresponding to the UE a determining sub-module 7018, configured to determine, according to the judging result of whether the UE is a UE frequently performing state transitions obtained by the third judging sub-module 7016, the terminal type of the UE and a storing sub-module 7019, configured to store a correspondence relation between the IMEI TAC of the UE or the subscriber identity corresponding to the UE obtained by the third obtaining sub-module 7017 and the terminal type of the UE determined by the determining sub-module 7018.

The network device provided in the embodiment of the present disclosure is an access network side device.

It should be noted that, in practical implementations, multiple modules of the network device provided in the embodiment of the present disclosure shown in FIG. 7 to FIG. 10 may also be implemented by one module or functional module which has similar functions to the multiple modules, which is not described in detail here.

For the specific implementation method for performing the state transition by using the network device provided in the embodiment of the present disclosure, reference may be made to the embodiments of the method for a state transition provided in the present disclosure, so the details will not be described here again.

For the network device provided in the embodiment of the present disclosure, the UE frequently performing state transitions is transitioned to the PCH state when the state of the UE is required to be transitioned to the idle state, and therefore does not need to frequently set up/release a radio access bearer for the UE, thereby lightening the workload during a state transition process of the UE frequently performing state transitions; the UE infrequently performing state transitions is transitioned to the idle state when the state of the UE is required to be transitioned to the idle state, and therefore does not need to maintain the PCH state of the UE infrequently performing state transitions, thereby lightening the workload during a state transition process of the UE infrequently performing state transitions. Through the technical solution provided in the embodiment of the present disclosure, the number of users in the PCH state is controlled while lightening the load on the signaling plane, so that the occupation of logic resources is reduced to ensure a system capacity.

The method for a state transition and the network device provided in the embodiments of the present disclosure may be used in a radio communication system.

In combination with the embodiments herein, steps of the method or algorithm described may be directly implemented by using hardware, a software module executed by a processor, or the combination thereof. The software module may be placed in a Random Access Memory (RAM), a memory, a Read-only Memory (ROM), an Electrically Programmable ROM (EPROM), an Electrically Erasable Programmable ROM (EEPROM), a register, a hard disk, a removable magnetic disk, a CD-ROM, or any storage medium of other forms well-known in the technical field.

The above is only the specific implementation of the present disclosure, but the protection scope of the present disclosure is not limited thereto. Any change or replacement that can be easily thought of by persons skilled in the art within the technical scope disclosed by the present disclosure shall fall within the protection scope of the present disclosure. Therefore, the protection scope of the present disclosure shall be subject to the protection scope of the claims.

What is claimed is:

1. A network device comprising:
    a processor; and
    a non-transitory computer readable storage medium storing programming for execution by the processor, the programming including instructions to:
    determine whether a user equipment (UE) is a UE frequently performing state transitions or a UE infrequently performing state transitions;
    if the UE is determined to be a UE frequently performing state transitions, then transition a state of the UE to a paging channel (PCH) state when no service data sent by the UE in a dedicated channel (DCH) state has been received within a preset counting time of a timer, the transition based on the determination that the UE is a UE frequently performing state transitions; and
    if the UE is determined to be a UE infrequently performing state transitions, then transition a state of the UE to an idle state when no service data sent by the UE in a dedicated channel (DCH) state has been received within a preset counting time of a timer, the transition based on the determination that the UE is a UE infrequently performing state transitions.

2. The network device according to claim 1, wherein the programming further includes instructions to:
   obtain an international mobile equipment identity TAC (IMEI TAC) of the UE; and
   determine whether the UE is a UE frequently performing state transitions or a UE infrequently performing state transitions according to the IMEI TAC obtained.

3. The network device according to claim 1, wherein the programming further includes instructions to:
   obtain a subscriber identity corresponding to the UE; and
   determine whether the UE is a UE frequently performing state transitions or a UE infrequently performing state transitions according to the subscriber identity obtained.

4. The network device according to claim 1, wherein the programming further includes instructions to:
   receive online state detection information sent by the UE within a preset counting time; and
   determine whether the UE is a UE frequently performing state transitions or a UE infrequently performing state transitions according to a number of times the online state detection information is received from the UE.

5. The network device according to claim 4, wherein the programming further includes instructions to:
   to determine that the UE is a UE frequently performing state transitions if the number of times is larger than or equal to a preset threshold; and
   to determine that the UE is a UE infrequently performing state transitions if the number of times is smaller than the threshold.

6. A method for a state transition, comprising:
   determine whether a user equipment (UE) is a UE frequently performing state transitions or a UE infrequently performing state transitions;
   if the UE is determined to be a UE frequently performing state transitions, then transition a state of the UE to a paging channel (PCH) state when no service data sent by the UE in a dedicated channel (DCH) state has been received within a preset counting time of a timer, the transition based on the determination that the UE is a UE frequently performing state transitions; and
   if the UE is determined to be a UE infrequently performing state transitions, then transition a state of the UE to an idle state when no service data sent by the UE in a dedicated channel (DCH) state has been received within a preset counting time of a timer, the transition based on the determination that the UE is a UE infrequently performing state transitions.

7. The method according to claim 6, wherein the determining whether the UE is a UE frequently performing state transitions or a UE infrequently performing state transitions comprises:
   obtaining an international mobile equipment identity TAC (IMEI TAC) of the UE; and
   determining, according to the IMEI TAC, whether the UE is a UE frequently performing state transitions or a UE infrequently performing state transitions.

8. The method according to claim 6, wherein the determining whether the UE is a UE frequently performing state transitions or a UE infrequently performing state transitions comprises:
   obtaining a subscriber identity corresponding to the UE; and
   determining, according to the subscriber identity, whether the UE is a UE frequently performing state transitions or a UE infrequently performing state transitions.

9. The method according to claim 6, wherein the determining whether the UE is a UE frequently performing state transitions or a UE infrequently performing state transitions comprises:
   receiving online state detection information sent by the UE within a preset counting time; and
   determining whether the UE is a UE frequently performing state transitions or a UE infrequently performing state transitions according to a number of times the online state detection information is received from the UE.

10. The method according to claim 9, wherein the determining according to a number of times the online state detection information is received from the UE comprises:
    determining that the UE is a UE frequently performing state transitions if the number of times is larger than or equal to a preset threshold; and
    determining that the UE is a UE infrequently performing state transitions if the number of times is smaller than the threshold.

* * * * *